US012420654B2

(12) United States Patent
Zarraonandia

(10) Patent No.: US 12,420,654 B2
(45) Date of Patent: Sep. 23, 2025

(54) MOUNT FOR A CHARGING STATION

(71) Applicant: Pre-Con Products, Simi Valley, CA (US)

(72) Inventor: David Zarraonandia, Thousand Oaks, CA (US)

(73) Assignee: Pre-Con Products, Simi Valley, CA (US)

( * ) Notice: Subject to any disclaimer, the term of this patent is extended or adjusted under 35 U.S.C. 154(b) by 826 days.

(21) Appl. No.: 17/701,282

(22) Filed: Mar. 22, 2022

(65) Prior Publication Data

US 2023/0311686 A1  Oct. 5, 2023

(51) Int. Cl.
*B60L 53/31* (2019.01)
*E01F 9/669* (2016.01)
*H02G 3/04* (2006.01)

(52) U.S. Cl.
CPC ............ *B60L 53/31* (2019.02); *H02G 3/0493* (2013.01); *E01F 9/669* (2016.02)

(58) Field of Classification Search
USPC ........................................................ 320/109
See application file for complete search history.

(56) References Cited

U.S. PATENT DOCUMENTS

| 5,270,489 | A | 12/1993 | Thibault | |
|---|---|---|---|---|
| 2019/0267822 | A1* | 8/2019 | Waffner | H02J 7/0042 |
| 2020/0328604 | A1* | 10/2020 | Molle | B60L 53/30 |
| 2021/0245614 | A1* | 8/2021 | Flynn | B60L 53/30 |
| 2023/0311686 | A1* | 10/2023 | Zarraonandia | E01F 9/673 |
| 2024/0322577 | A1* | 9/2024 | Zarraonandia | B60L 53/30 |

FOREIGN PATENT DOCUMENTS

| EP | 3700033 A1 | 8/2020 | |
|---|---|---|---|
| WO | 2020245613 A1 | 12/2020 | |
| WO | WO-2023183273 A1 * | 9/2023 | B60L 53/30 |

* cited by examiner

*Primary Examiner* — Mohammed Alam
(74) *Attorney, Agent, or Firm* — Thompson Coburn LLP

(57) ABSTRACT

A mount for a charging station comprising a precast concrete base. The precast concrete base has a bottom surface, a top surface, and a base height. The base height is the distance from the bottom surface to the top surface. The mount further comprises a through hole extending from the bottom surface to the top surface. The through hole is centrally located on the precast concrete base. The mount further comprises a plurality a plurality of non-through holes extending upward from the bottom surface toward the top surface. Each of the plurality of non-through holes has a depth that is less than the base height. Each of the plurality of non-through holes is adapted and configured to enable a user to increase the depth of each of the non-through holes to convert the plurality of non-through holes to a plurality of bollard mounting holes.

18 Claims, 6 Drawing Sheets

MOUNT FOR A CHARGING STATION

CROSS-REFERENCE TO RELATED APPLICATIONS

Not Applicable.

STATEMENT REGARDING FEDERALLY SPONSORED RESEARCH OR DEVELOPMENT

Not Applicable.

Appendix

Not Applicable.

BACKGROUND OF THE INVENTION

Field of the Invention

This invention pertains to a mount for a charging station.

SUMMARY

One aspect of the disclosure is a mount for a charging station comprising a precast concrete base. The precast concrete base has a bottom surface, a top surface, and a base height. The base height is the distance from the bottom surface to the top surface. The mount further comprises a through hole extending from the bottom surface to the top surface. The through hole is centrally located on the precast concrete base. The mount further comprises a plurality a plurality of non-through holes extending upward from the bottom surface toward the top surface. Each of the plurality of non-through holes has a depth that is less than the base height. Each of the plurality of non-through holes is adapted and configured to enable a user to increase the depth of each of the non-through holes to convert the plurality of non-through holes to a plurality of bollard mounting holes.

Another aspect of the disclosure is a mount for a charging station comprising a precast concrete base. The precast concrete base has a bottom surface, a top surface, and a base height. The base height is the distance from the bottom surface to the top surface. The mount further comprises a through hole extending from the bottom surface to the top surface. The through hole is centrally located on the precast concrete base. The mount further comprises a plurality of bollard mounting holes. The bollard mounting holes extend upward from the bottom surface to the top surface. The mount further comprises a plurality of bollards. Each of the plurality of bollards extends through a corresponding one of the plurality of bollard mounting holes and projects above the top surface.

Further features and advantages, as well as the operation, are described in detail below with reference to the accompanying drawings.

Figure 1:
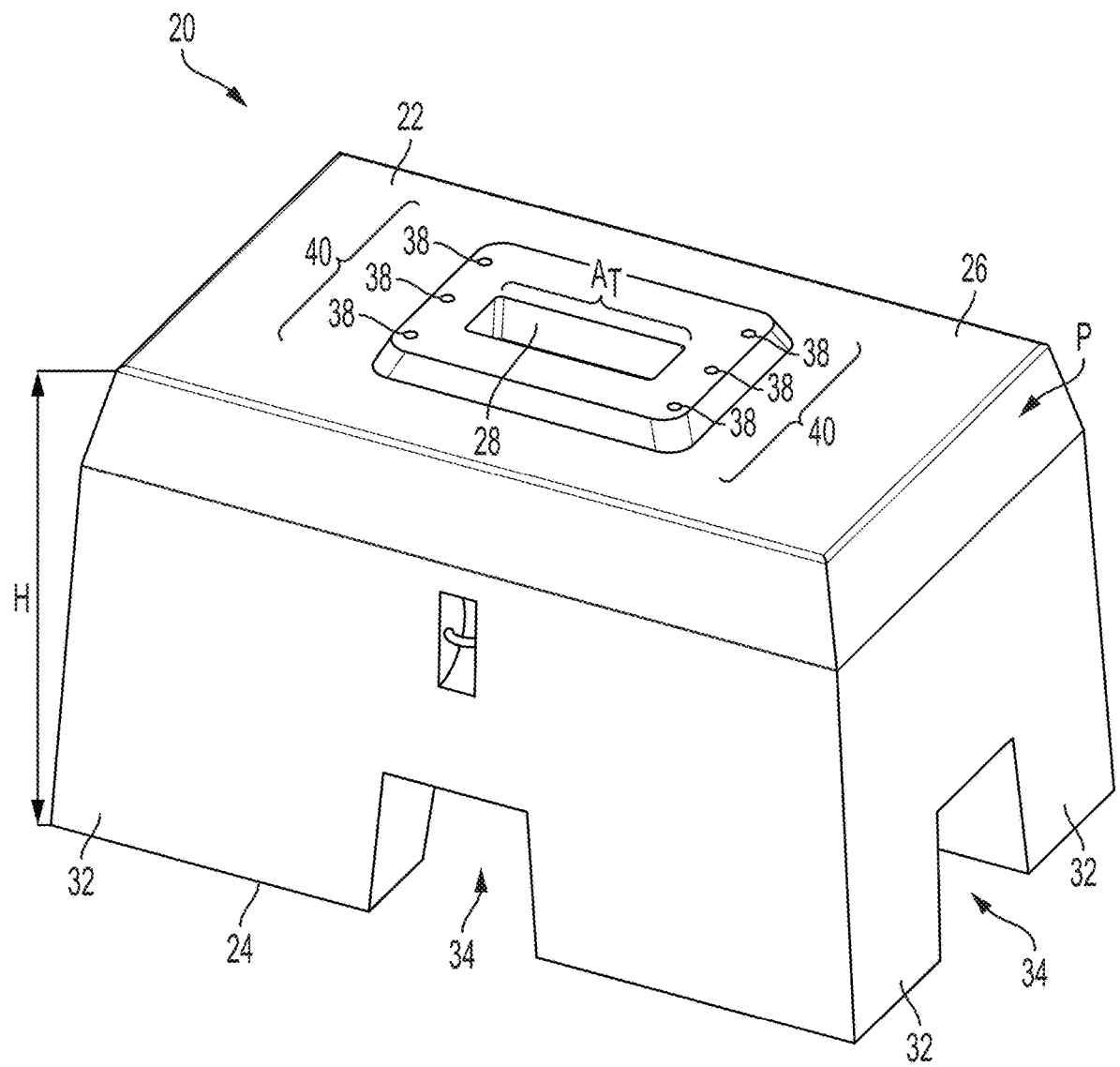
FIG. 1 is an isometric view of a mount for a charging station.
Figure 2:
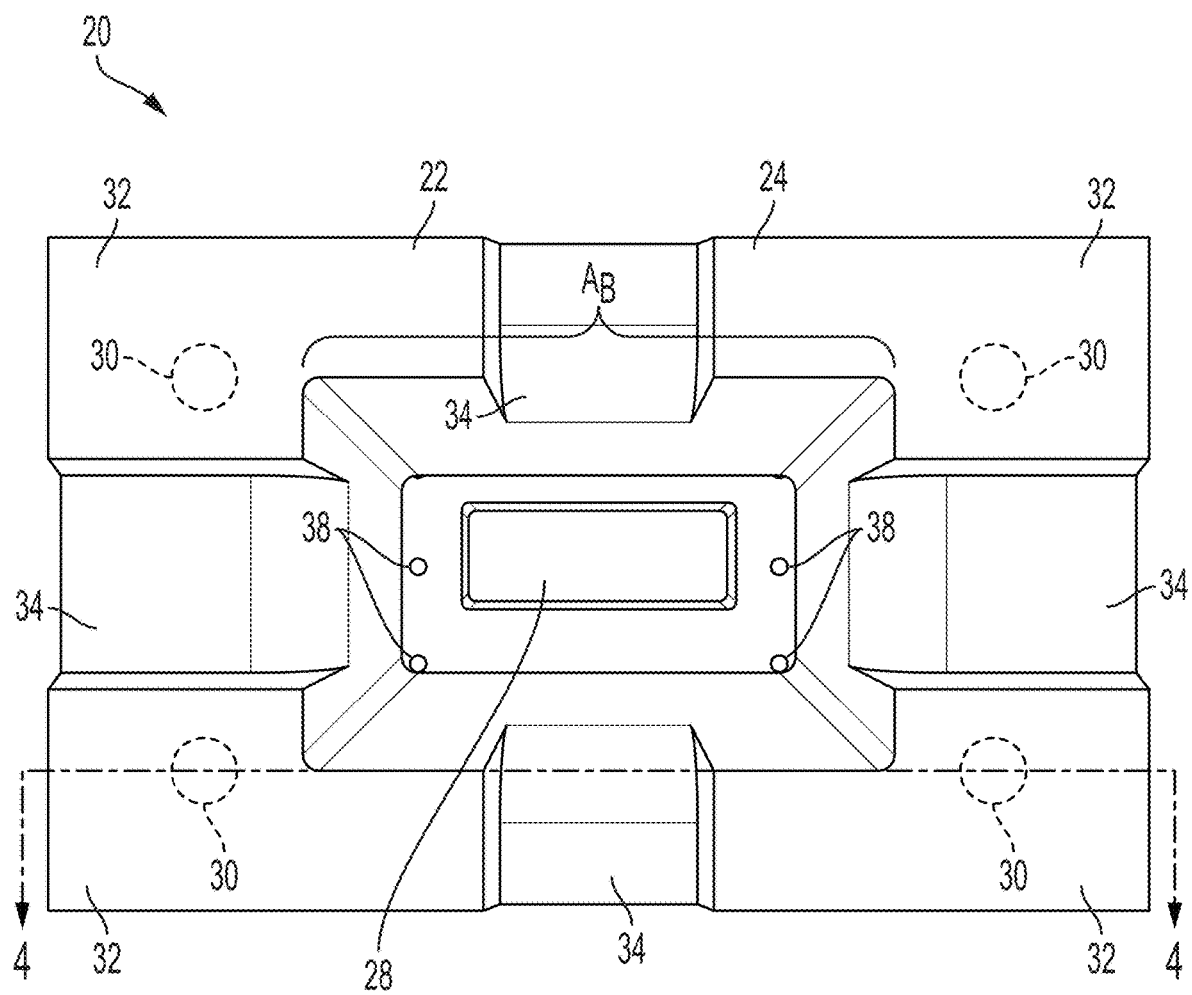
FIG. 2 is a bottom view of the mount for a charging station of FIG. 1.
Figure 3:
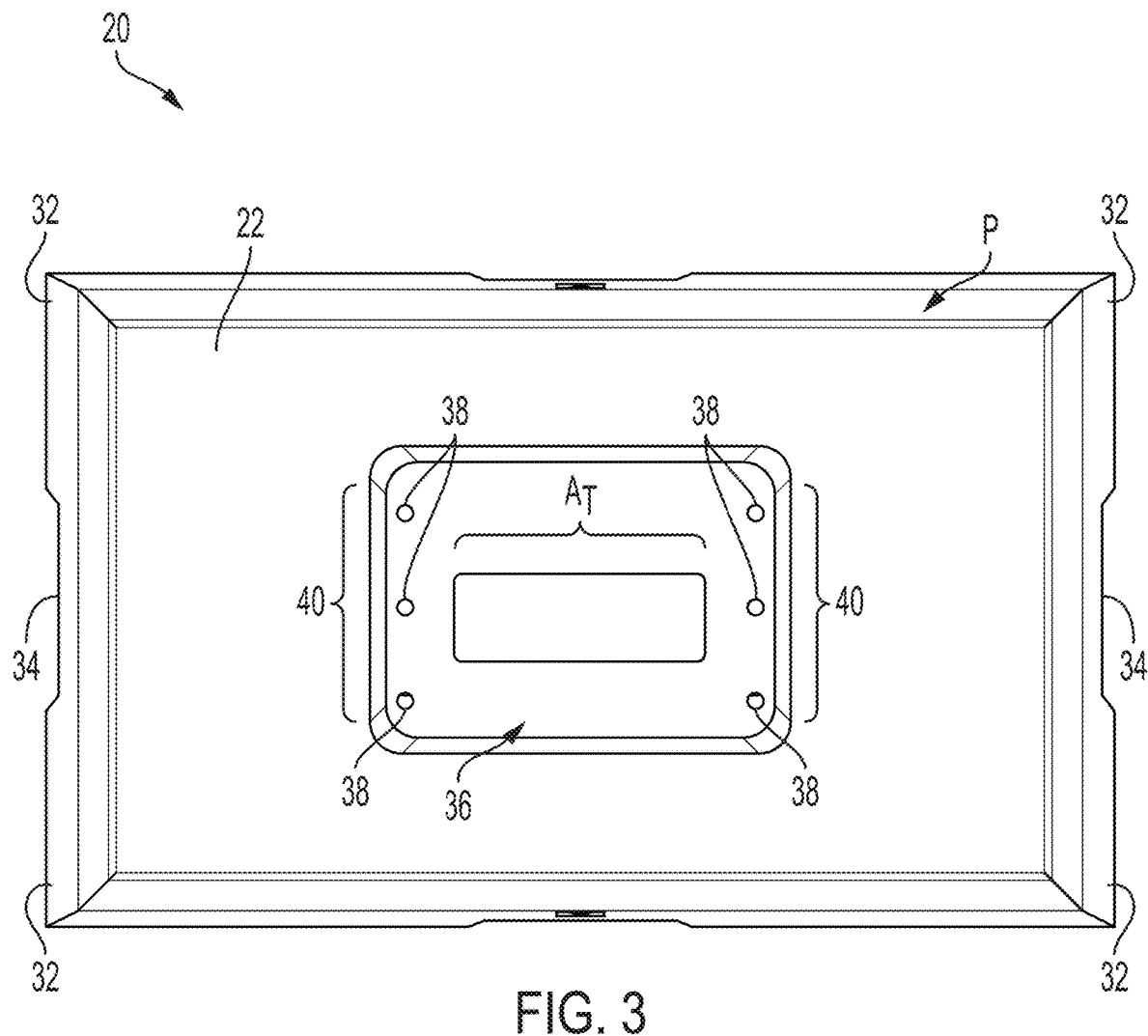
FIG. 3. Is a top view of the mount for a charging station of FIG. 2.
Figure 4:
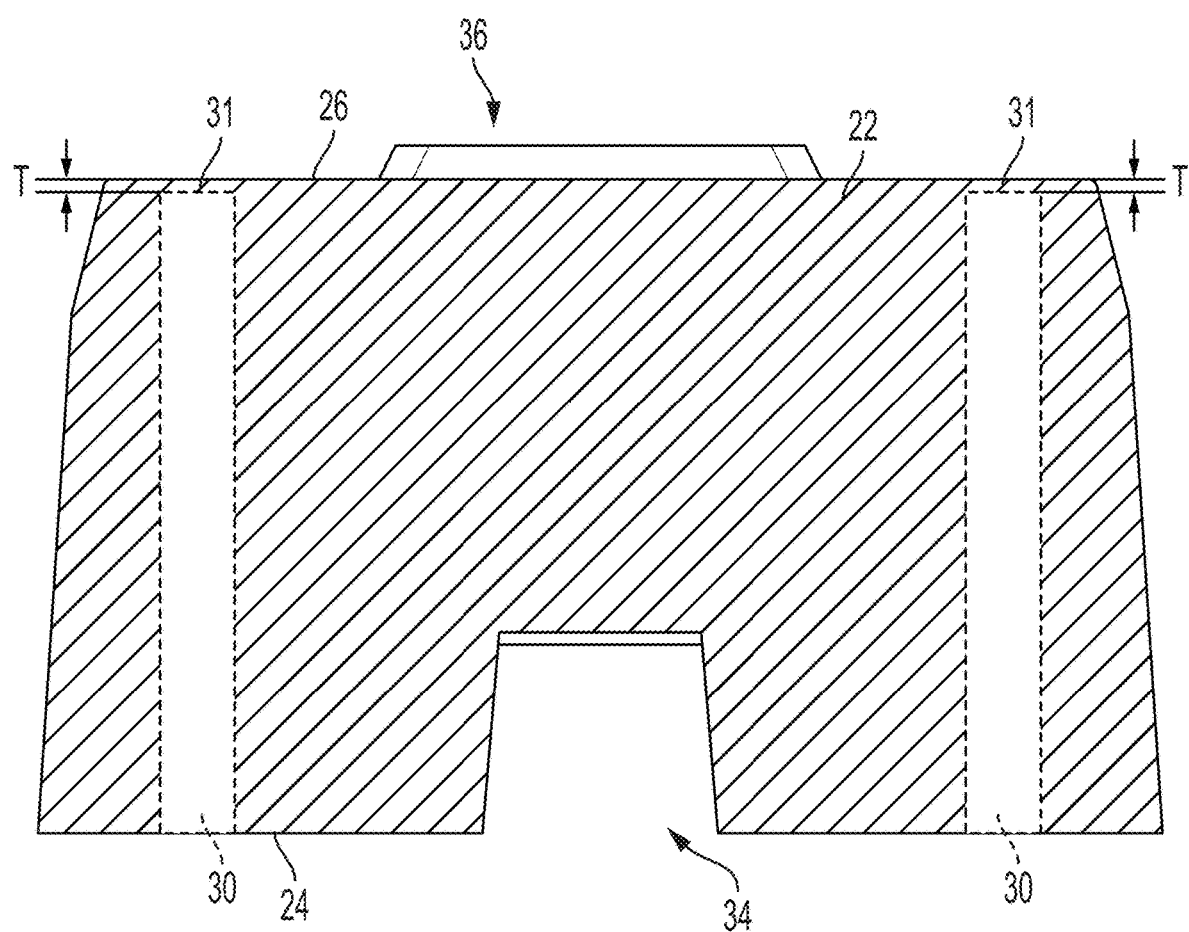
FIG. 4 is a section view of the mount for a charging station, taken along the line 4-4 shown in FIG. 2.

Reference numerals in the written specification and in the figure indicate corresponding items.

DETAILED DESCRIPTION

An embodiment of a mount for a charging station in accordance with the present disclosure is indicated generally by reference number 20 (FIGS. 1-4). The mount 20 comprises a precast concrete base 22. The precast concrete base 22 has a bottom surface 24, a top surface 26, and a base height H. The base height H is the distance from the bottom surface 24 to the top surface 26.

The mount 20 further comprises a through hole 28 extending from the bottom surface 24 to the top surface 26. The through hole 28 may be centrally located on the precast concrete base 22, or may be offset depending on the charging station used with the mount 20. The through hole 28 may be rectangular in a cross section taken in a plane parallel to the top surface 26. The through hole 28 may have a through hole top area $A_T$ and a through hole bottom area $A_B$. The through hole 28 may taper outwardly from the top surface 26 to the bottom surface 24 such that the through hole top area $A_T$ is smaller than the through hole bottom area $A_B$. This structure assists in the connection of electrical conduits to a charging station by providing a wide area in which to insert the cables, with a taper which allows the cables to slowly curve from the horizontal in-ground position to the generally upright position needed to connection the cables to the charging station.

The mount 20 further comprises a plurality of non-through holes 30 extending upward from the bottom surface 24 towards the top surface 26. Each of the plurality of non-through holes 30 has a depth that is less than the base height H. Each of the plurality of non-through holes 30 is adapted and configured to enable a user to increase the depth of said each of the plurality of non-through holes 30 to convert the plurality of non-through holes 30 to a plurality of bollard mounting holes. For example, the mount 20 may comprise a plurality of knockout portions 31. Each knockout portion 31 is adjacent a corresponding one of the plurality of non-through holes 30. Each knockout portion 31 has a thickness T of 0.5 to 1.5 inches. For example, each knockout portion 31 may have a thickness T of 0.75 inches±0.125 inches. Each knockout portion 31 is adapted to be removed to enable conversion of the non-through holes into bollard mounting holes.

The bottom surface 24 of the mount 20 comprises a plurality of feet 32. Each of the plurality of feet 32 may include a corresponding one of the plurality of non-through holes 30.

The precast concrete base 22 further comprises a plurality of cable passageways 34 between adjacent feet of the plurality of feet 32. The cable passageways 34 and the through hole 28 are sized and positioned to enable an electric cable to extend through the through hole 28 and one of the plurality of cable passageways 34. For example, the through hole 28 and the plurality of cable passageways 34 may be adapted and configured to facilitate an electrical connection between a plurality of electrical conduits and a charging station.

The top surface 26 may comprise a raised area 36 adjacent the through hole 28 and corresponding to the shape of the through hole 28. The raised area 36 may be adapted and configured to prevent water from flowing into the through hole 28 when a charging station is connected to the mount 20. The raised area 36 may comprise a plurality of bolt holes 38 arranged in a bolt pattern 40. The bolt pattern 40 may correspond to the mounting holes of a charging station.

The top surface 26 may have a perimeter P, which is sloped to match a typical curb profile.

Figure 5:
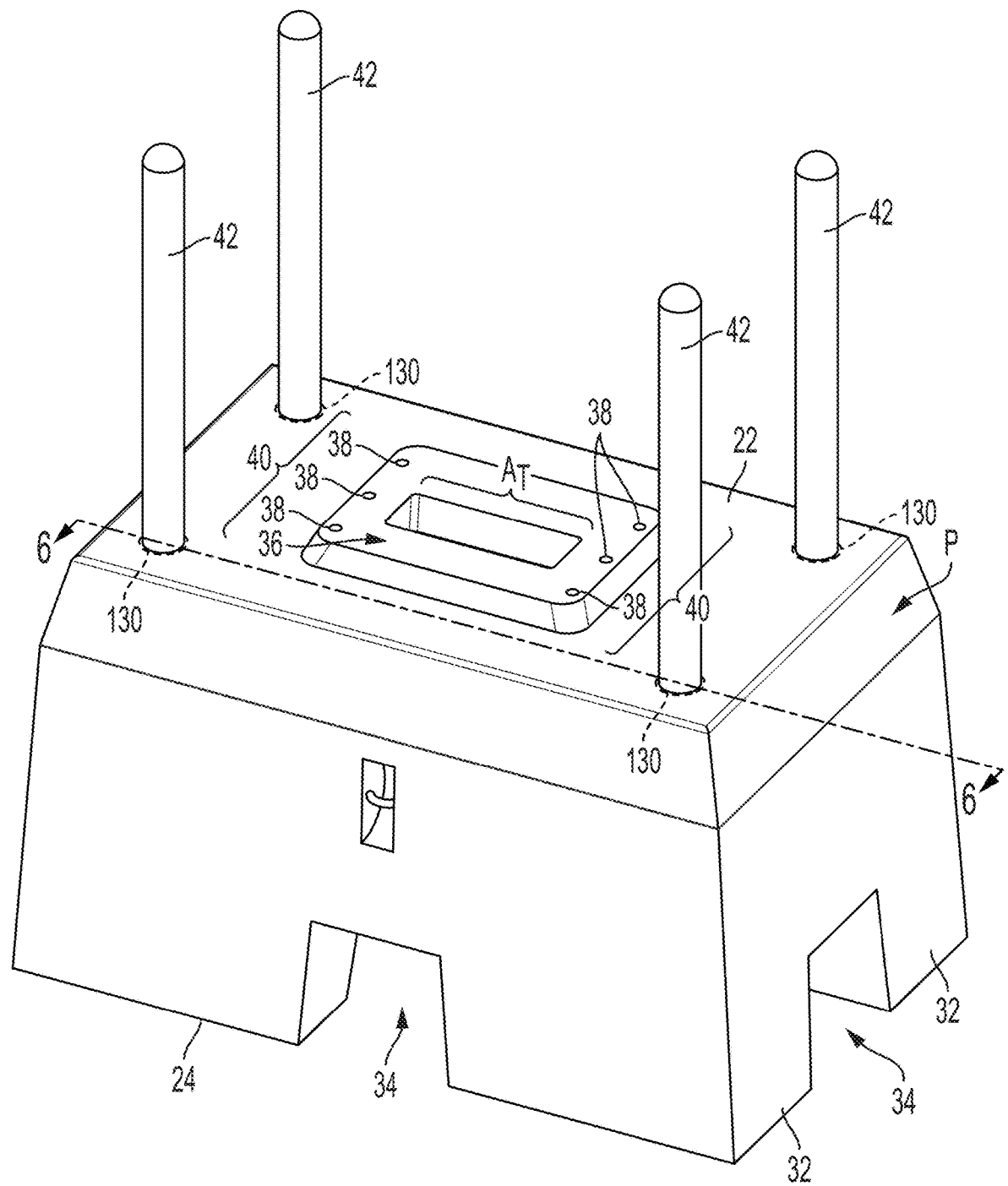
FIG. 5 is an isometric view of the mount of FIGS. 1-4, but with knockout portions removed to form bollard mounting holes, and with bollard extending from the bollard mounting holes.
Figure 6:
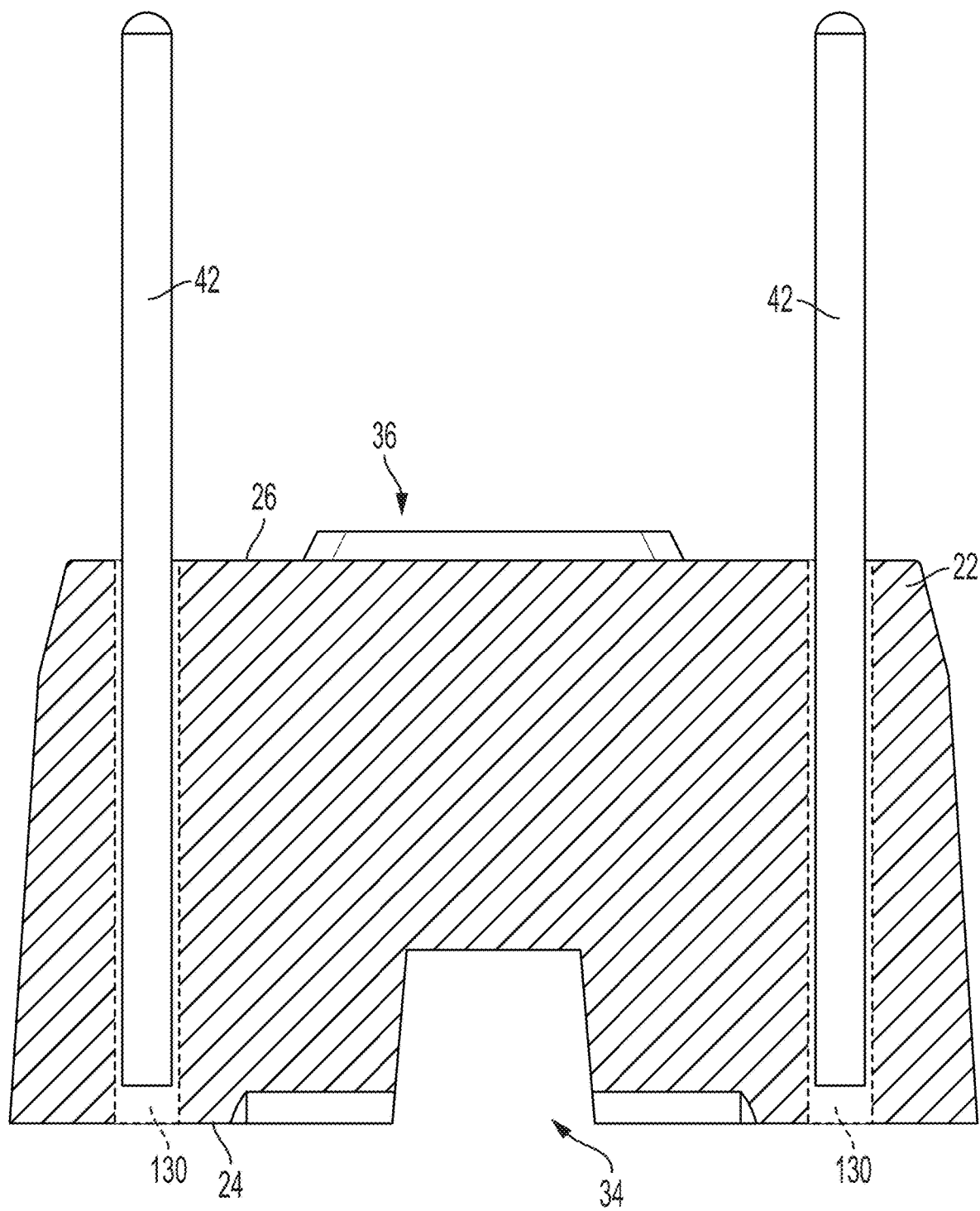
FIG. 6 is a section view of the mount for a charging station, taken along the line 6-6 shown in FIG. 5.

FIGS. 5-6 show the mount 20 with the knockout portions 31 removed to convert the non-through holes 30 into bollard mounting holes 130. As shown in FIGS. 5-6, a plurality of bollards 42 project upward from the bollard mounting holes 130. Lower portions of the bollards 42 may extend entirely through the bollard mounting holes 130, with upper portions of the bollards projecting upward from the top surface 26. Although FIGS. 5-6 show four bollards, it is to be understood that a user could choose to convert fewer of the non-through holes 30 into bollard mounting holes 130, if only one, two, or three bollards was desired for a particular installation. It is also to be understood that although the mount 20 is shown and described as being precast with four knockout portions 31, the mount could alternatively be pre-cast with one, two, three, or four bollard mounting holes.

In view of the foregoing, it should be appreciated that the invention has several advantages over the prior art.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A mount for a charging station, the mount comprising:
   a precast concrete base having a bottom surface, a top surface, and a base height, the base height being the distance from the bottom surface to the top surface;
   a through hole extending from the bottom surface to the top surface, the through hole being centrally located on the precast concrete base;
   a plurality of non-through holes extending upward from the bottom surface toward the top surface, each of the plurality of non-through holes having a depth that is less than the base height, each of the plurality of non-through holes being adapted and configured to enable a user to increase the depth of said each of the plurality of non-through holes to convert the plurality of non-through holes to a plurality of bollard mounting holes, the non-through holes being sized for receiving bollards; and
   a plurality of knockout portions, each knockout portion being adjacent a corresponding one of the plurality of non-through holes, each knockout portion having a thickness of 0.5 to 1.5 inches, each knockout portion being adapted to be removed to enable conversion of the non-through holes into the plurality of bollard mounting holes.

2. The mount of claim 1, wherein the bottom surface comprises a plurality of feet and the precast concrete base comprises a plurality of cable passageways between adjacent feet of the plurality of feet, and wherein the cable passageways and the through hole are sized and positioned to enable an electric cable to extend through the through hole and one of the plurality of cable passageways.

3. The mount of claim 2 wherein each of the plurality of feet includes a corresponding one of the plurality of bollard mounting holes.

4. The mount of claim 1 wherein each of the knockout portions has a thickness of 0.75 inches plus or minus 0.125 inches.

5. The mount of claim 2, wherein the through hole has a through hole top area and a through hole bottom area, and the through hole tapers outwardly from the top surface to the bottom surface such that the through hole top area is smaller than the through hole bottom area.

6. The mount of claim 5, wherein the through hole is rectangular in a cross section taken in a plane parallel to the top surface.

7. The mount of claim 5 wherein the through hole and the plurality of cable passageways are adapted and configured to facilitate an electrical connection between a plurality of electrical conduits and a charging station.

8. The mount of claim 6 wherein the top surface comprises a raised area adjacent the through hole and corresponding to the shape of the through hole, the raised area being adapted and configured to prevent water from flowing into the through hole when a charging station is connected to the mount.

9. The mount of claim 7 wherein the raised area comprises a plurality of bolt holes arranged in a bolt pattern, the bolt pattern corresponding to the mounting holes of a charging station.

10. The mount of claim 7 wherein the top surface has a perimeter, the perimeter being sloped to match a typical curb profile.

11. A mount for a charging station, the mount comprising:
   a precast concrete base having a bottom surface, a top surface, and a base height, the base height being the distance from the bottom surface to the top surface;
   a through hole extending from the bottom surface to the top surface, the through hole being centrally located on the precast concrete base;
   a plurality of bollard mounting holes extending upward from the bottom surface to the top surface;
   a plurality of bollards, each of the plurality of bollards extending through a corresponding one of the plurality of bollard mounting holes and projecting above the top surface;
   wherein the bottom surface is divided into a plurality of feet and the precast concrete base comprises a plurality of cable passageways between adjacent feet of the plurality of feet, and wherein the cable passageways and the through hole are sized and positioned to enable an electric cable to extend through the through hole and one of the plurality of cable passageways, each of the plurality of cable passageways having a depth not greater than 50% of the base height.

12. The mount of claim 11 wherein one of the plurality of bollard mounting holes is located on each of the plurality of feet.

13. The mount of claim 12, wherein the through hole has a through hole top area and a through hole bottom area, and the through hole tapers outwardly from the top surface to the bottom surface such that the through hole top area is smaller than the through hole bottom area.

14. The mount of claim 13, wherein the through hole is rectangular in a cross section taken in a plane parallel to the top surface.

15. The mount of claim 13 wherein the through hole and the plurality of cable passageways are adapted and configured to facilitate an electrical connection between a plurality of electrical conduits and a charging station.

16. The mount of claim 15 wherein the top surface comprises a raised area adjacent the through hole and corresponding to the shape of the through hole, the raised area being adapted and configured to prevent water from flowing into the through hole when a charging station is connected to the mount.

17. The mount of claim 16 wherein the raised area comprises a plurality of bolt holes arranged in a bolt pattern, the bolt pattern corresponding to the mounting holes of a charging station.

18. The mount of claim 17 wherein the top surface has a perimeter, the perimeter being sloped to match a typical curb profile.

* * * * *